United States Patent
Zhao et al.

(10) Patent No.: US 12,360,872 B2
(45) Date of Patent: Jul. 15, 2025

(54) PERFORMANCE BENCHMARK FOR HOST PERFORMANCE BOOSTER

(71) Applicant: Micron Technology, Inc., Boise, ID (US)

(72) Inventors: Bin Zhao, Shanghai (CN); Lingyun Wang, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 277 days.

(21) Appl. No.: 17/597,985

(22) PCT Filed: Mar. 16, 2021

(86) PCT No.: PCT/CN2021/081061
§ 371 (c)(1),
(2) Date: Jan. 31, 2022

(87) PCT Pub. No.: WO2022/193126
PCT Pub. Date: Sep. 22, 2022

(65) Prior Publication Data
US 2023/0359538 A1    Nov. 9, 2023

(51) Int. Cl.
*G06F 11/30* (2006.01)
*G06F 11/34* (2006.01)
(Continued)

(52) U.S. Cl.
CPC ...... *G06F 11/3037* (2013.01); *G06F 11/3409* (2013.01); *G06F 12/0292* (2013.01);
(Continued)

(58) Field of Classification Search
CPC ............ G06F 11/3037; G06F 11/3409; G06F 12/0292; G06F 12/0871; G06F 12/0877;
(Continued)

(56) References Cited

U.S. PATENT DOCUMENTS 7,688,753 B1 * 3/2010 Zimran ................. H04L 67/06
                                                     702/182
9,563,382 B2 * 2/2017 Hahn ................. G06F 12/0802
(Continued)

FOREIGN PATENT DOCUMENTS

CN         1499382 A     5/2004
CN       110858180 A     5/2020
(Continued)

OTHER PUBLICATIONS

Jeong, W., Cho, H., Lee, Y., Lee, J., Yoon, S., Hwang, J., & Lee, D. (2017). Improving flash storage performance by caching address mapping table in host memory. In 9th USENIX Workshop on Hot Topics in Storage and File Systems (HotStorage 17). (Year: 2017).*
(Continued)

*Primary Examiner* — Reginald G Bragdon
*Assistant Examiner* — Aaron D Ho
(74) *Attorney, Agent, or Firm* — Holland & Hart LLP

(57) ABSTRACT

Methods, systems, and devices for performance benchmark for host performance booster are described. The memory system may receive a plurality of read commands from a host system. The memory system may detect a pattern of random physical addresses as part of the plurality of read commands and increase an amount of space in a cache of the memory system based on the detected pattern. In some cases, the amount of space may be used for mapping between logical block addresses and physical addresses. The memory system may determine, for a different plurality of read commands, whether a rate of cache hits for a portion of the mapping satisfies a threshold. In some cases, the memory system may determine whether to activate a host performance booster mode based on determining whether the rate of cache hits satisfies the threshold.

17 Claims, 4 Drawing Sheets

(51) Int. Cl.
*G06F 12/02* (2006.01)
*G06F 12/0871* (2016.01)
*G06F 12/0877* (2016.01)

(52) U.S. Cl.
CPC ...... *G06F 12/0871* (2013.01); *G06F 12/0877* (2013.01); *G06F 2212/7201* (2013.01)

(58) Field of Classification Search
CPC ................ G06F 12/10; G06F 12/1027; G06F 2212/1021; G06F 2212/1041; G06F 2212/304; G06F 2212/3042; G06F 2212/305; G06F 2212/311; G06F 2212/502; G06F 2212/601; G06F 2212/604; G06F 2212/70; G06F 2212/7201; G06F 2212/7202
USPC ........................................................ 711/154
See application file for complete search history.

(56) References Cited

U.S. PATENT DOCUMENTS

| | | | |
|---|---|---|---|
| 9,767,032 B2* | 9/2017 | Talagala | G06F 12/0866 |
| 10,613,983 B2* | 4/2020 | Agarwal | G06F 3/0653 |
| 11,036,625 B1* | 6/2021 | Balluchi | G06F 12/1063 |
| 11,249,911 B2* | 2/2022 | Kim | G06F 12/0882 |
| 11,301,372 B1* | 4/2022 | Huo | G06F 12/0882 |
| 11,748,032 B2* | 9/2023 | Chen | G06F 3/0679 711/154 |
| 2008/0005466 A1* | 1/2008 | Lubbers | G06F 12/126 711/E12.075 |
| 2009/0019229 A1* | 1/2009 | Morrow | G06F 12/0862 711/137 |
| 2011/0106754 A1* | 5/2011 | Joshi | H04L 61/4523 711/170 |
| 2014/0129761 A1 | 5/2014 | Kwon et al. | |
| 2014/0173135 A1* | 6/2014 | Varney | H04L 47/83 709/245 |
| 2018/0091619 A1* | 3/2018 | Power | H04L 67/561 |
| 2019/0197760 A1* | 6/2019 | Cho | G06T 15/005 |
| 2019/0235762 A1* | 8/2019 | Kaburaki | G06F 12/0864 |
| 2020/0089617 A1* | 3/2020 | Onishi | G06F 12/0246 |
| 2020/0210334 A1* | 7/2020 | Sahin | G06F 12/0802 |
| 2020/0233796 A1* | 7/2020 | Kim | G06F 12/123 |
| 2020/0310984 A1* | 10/2020 | Choi | G06F 12/0246 |
| 2020/0320008 A1* | 10/2020 | Byun | G06F 11/3037 |
| 2020/0327063 A1* | 10/2020 | Kang | G06F 12/0871 |
| 2020/0394139 A1* | 12/2020 | Lee | G06F 12/10 |
| 2021/0157725 A1* | 5/2021 | Barbalho | G06F 12/0802 |
| 2021/0216462 A1* | 7/2021 | Kucherov | G06F 12/0292 |
| 2021/0326201 A1* | 10/2021 | Lee | G06F 7/582 |
| 2021/0334217 A1* | 10/2021 | Sharma | G06F 12/0246 |
| 2021/0334218 A1* | 10/2021 | Jung | G06F 12/0246 |
| 2022/0012174 A1* | 1/2022 | Seok | G06F 3/061 |
| 2022/0019541 A1* | 1/2022 | Dubey | G06F 13/1668 |
| 2022/0019547 A1* | 1/2022 | Shih | G06F 12/1009 |
| 2022/0050741 A1* | 2/2022 | Lee | G06F 3/0679 |
| 2022/0067549 A1* | 3/2022 | Vokaliga | G06N 5/04 |
| 2022/0156185 A1* | 5/2022 | Colella | G06F 12/0223 |
| 2022/0215008 A1* | 7/2022 | Adibowo | G06F 12/0802 |
| 2023/0009375 A1* | 1/2023 | Lu | G06N 3/08 |

FOREIGN PATENT DOCUMENTS

| | | |
|---|---|---|
| CN | 111128287 A | 5/2020 |
| CN | 111324550 A | 6/2020 |
| CN | 111831583 A | 10/2020 |
| CN | 112100088 A | 12/2020 |
| CN | 112166420 A | 1/2021 |

OTHER PUBLICATIONS

Jedec Standard, "Universal Flash Storage (UFS) Host Performance Booster (HPB) Extension", Version 1.0, JESD220-3, (2019), 34 pgs (Year: 2019).*
Sharma, Hitesh Kumar, Aditya Shastri, Ranjit Biswas, and Sanjeev Kumar Singh. "SGA Dynamic Parameters: The Core Components of Automated Database Tuning." Database Systems Journal 5, No. 2 (2014): 13-21. (Year: 2014).*
Daoud, Amjad. "Oracle: Performance Tuning with OMLET 4." (1999). (Year: 1999).*
ISA/CN, International Search Report and Written Opinion of the International Searching Authority, Int'l Appl. No. PCT/CN2021/081061, Sep. 28, 2021, China National Intellectual Property Administration, Beijing, People's Republic of Chian, 10 pgs.

* cited by examiner

PERFORMANCE BENCHMARK FOR HOST PERFORMANCE BOOSTER

CROSS REFERENCE

The present Application for patent is a 371 national phase filing of International Patent Application No. PCT/CN2021/081061 by Zhao et al., entitled "PERFORMANCE BENCHMARK FOR HOST PERFORMANCE BOOSTER," filed Mar. 16, 2021, assigned to the assignee hereof, and expressly incorporated by reference herein.

FIELD OF TECHNOLOGY

The following relates generally to one or more systems for memory and more specifically to performance benchmark for host performance booster.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
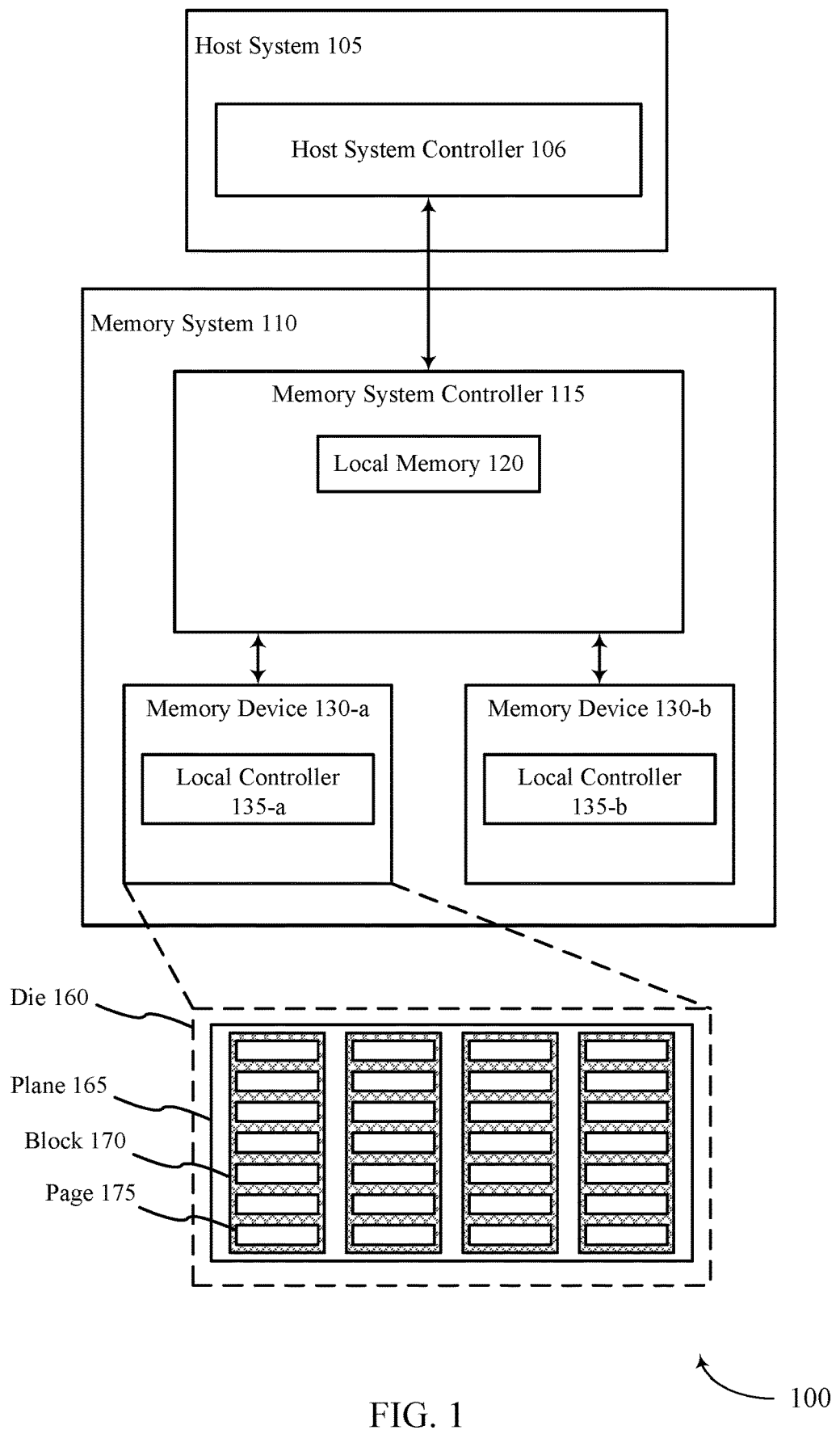
FIG. 1 illustrates an example of a system that supports performance benchmark for host performance booster in accordance with examples as disclosed herein.

Some memory systems may perform access operations using a host performance booster (HPB) mode. An HPB command may include (among other things) a physical address rather than a logical block address in the command. Such a feature may allow the memory system to skip some address translation steps and thereby save time. The HPB operations may be facilitated by a portion of the L2P table being located at the host system, which may allow the host system to perform the address translation steps before transmitting the HPB command. To operate using HPB, the host system may upload, from the memory system, at least a portion of mapping between logical addresses and physical addresses (e.g., a portion of a logical-to-physical (L2P) table) prior to performing a read operation. In some cases, the memory system may perform an HPB read operation based on receiving an HPB command that includes a physical address (rather than a logical block address). Activating or deactivating regions of the memory system for HPB mode may take computing resources. For example, the memory system may have to communicate the mapping to the host system as part of the initialization process. Performing HPB commands (after initialization), however, may be take less time and computing resources at the memory system.

The host performance booster mode may be effective when used for accessing portions of the memory system that are more frequently accessed. Increasing the size or quantity of regions of the memory system that are used as part of the HPB mode may eventually use too many computing resources to be efficient. For example, communicating large portions of the mapping (e.g., L2P table) to the host system and maintaining the information stored at the host system may consume an additional amount of firmware overhead as compared to a normal mode of operation (e.g., not using the host performance booster mode), thereby increasing the latency for performing operations. Additionally or alternatively, frequently activating and deactivating regions of the memory system for the HPB mode may cause the memory system to experience a performance drop. Some conditions of the memory system may be helpful to consider when determining whether to activate or deactivate a region for use as part of the HPB mode. For example, activating the host performance booster mode regardless of the cache hit rate may decrease the overall performance of the memory system, thereby increasing the latency for other operations related to the host system and decreased read, write, and erase speeds and efficiency.

Systems, devices, and techniques are described for benchmarking performance of the host performance booster mode of a memory system. In such cases, the memory system may receive a read command and detect a random read pattern. If a random read pattern is detected, the memory system may extend a size of the mapping (e.g., L2P table) stored in a cache (e.g., a static random access memory (SRAM) of the memory system). Based on increasing an amount of space for stored the mapping in the cache, the incoming read commands may include logical block addresses for which the mapping is already loaded into the cache, thereby increasing the cache hit rate for the incoming read commands. If the cache hit rate satisfies a threshold, it may be more efficient to continue to operate in a normal mode than to transition the region to an HPB mode. The memory system may determine whether a cache hit rate associated with portion of the mapping (e.g., L2P table) stored in the cache satisfies a threshold and determine whether to activate host performance booster mode based on the cache hit rate. The memory system may identify the cache hit rate associated with the mapping stored in the cache for incoming access operations. If the cache hit rate is below a threshold, then the system may activate the host performance booster mode for the region. For example, the memory system may activate the host performance booster mode if the cache hit rate is below a threshold. In other examples, the memory system may evaluate the performance of normal operations (e.g., a random read operation), and if the performance is above a threshold, the system may refrain from starting the host performance booster mode, thereby reducing a performance drop caused by entering the host performance booster mode regardless of the condition of the memory system.

In effect, the memory system may dynamically adjust the threshold for causing a region of the memory system to enter or exit the host performance booster mode. Such techniques may increase the overall performance of the memory system, thereby decreasing the latency for other operations related to the host system. For example, tuning the threshold for entering the host performance booster mode based on the condition of the memory system may reduce the firmware overhead and improve the overall efficiency of the memory system associated with activating or deactivating regions of the memory system for use as part of a HPB mode, which may result in the memory system experiencing improved read, write, and erase speeds, reduced power consumption, improved processing times and the like.

Features of the disclosure are initially described in the context of a system with reference to FIG. 1. Features of the disclosure are described in the context of a flow diagram with reference to FIG. 2. These and other features of the disclosure are further illustrated by and described in the context of an apparatus diagram and a flowchart that relate to performance benchmark for host performance booster with reference to FIGS. 3-4.

FIG. 1 illustrates an example of a system 100 that supports performance benchmark for host performance booster in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support performance benchmark for host performance booster. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, the memory system 110 may receive a read command and detect a random read pattern associated with the read command. The memory system 110 may extend (e.g., increase an amount of space) in a cache (e.g., SRAM) to store a mapping between logical block addresses and physical addresses (e.g., L2P table). For example, the memory system 110 may allocate an additional amount of space in the cache memory to store the L2P table. In some cases, the memory system 110 may determine a cache hit rate for the portion of the L2P table that may be stored in the cache memory. In such cases, the memory system 110 may determine whether to activate a host performance booster mode based on determining whether the cache hit rate satisfies a threshold.

For example, if the cache hit rate satisfies (e.g., is above) the threshold, the memory system 110 may refrain from activating the host performance booster mode and perform a read operation without the host performance booster mode. In other examples, if the cache hit rate fails to satisfy (e.g., is below) the threshold, the memory system 110 may activate the host performance booster mode and perform a read operation using the host performance booster mode.

Figure 2:
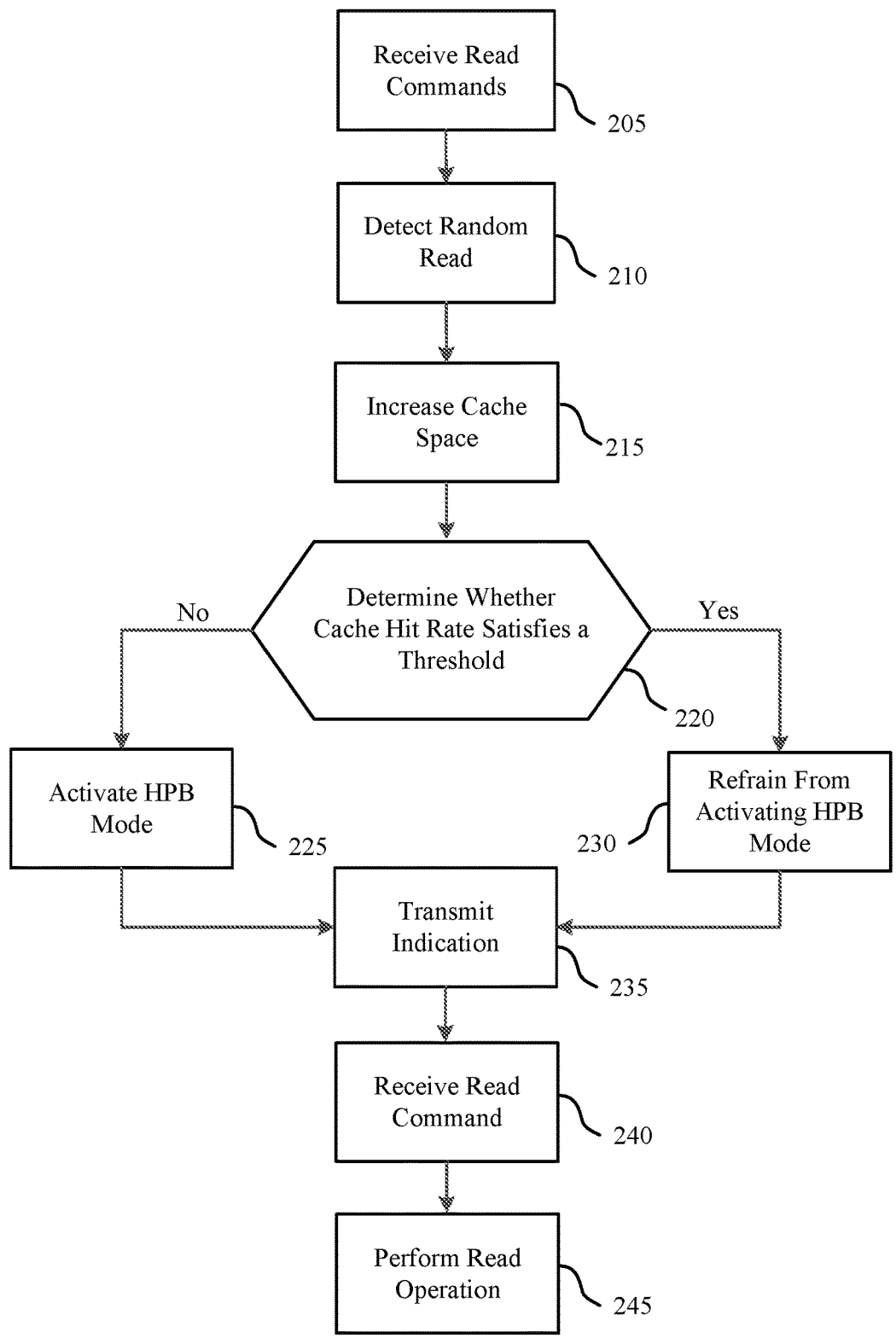
FIG. 2 illustrates an example of a flow diagram that supports performance benchmark for host performance booster in accordance with examples as disclosed herein.

FIG. 2 illustrates an example of a flow diagram 200 that supports performance benchmark for host performance booster in accordance with examples as disclosed herein. The operations of flow diagram 200 may be implemented by any device or its components as described herein. For example, the operations of flow diagram 200 may be performed by a memory system as described with reference to FIG. 1. Alternative examples of the following may be implemented, where some steps are performed in a different order or not at all. Some steps may additionally include additional features not mentioned below. The flow diagram 200 illustrates techniques where a memory system utilizes a performance benchmark for host performance booster (e.g., HPB).

Aspects of the flow diagram 200 may be implemented by a controller, among other components. Additionally or alternatively, aspects of the flow diagram 200 may be implemented as instructions stored in memory (e.g., firmware stored in a memory coupled with the memory system). For example, the instructions, when executed by a controller (e.g., the memory system controller 115), may cause the controller to perform the operations of the flow diagram 200.

The host performance booster mode may cause some aspects of an access operation (e.g., read operation or write operation) to be performed by a host system rather than performed by the memory system. An HPB command may include (among other things) a physical address rather than a logical block address in the command. Such a feature may allow the memory system to skip some address translation steps and thereby save time. The HPB operations may be facilitated by a portion of the L2P table being located at the host system, which may allow the host system to perform the address translation steps before transmitting the HPB command. To operate using HPB, the host system may upload, from the memory system, at least a portion of mapping between logical addresses and physical addresses (e.g., a portion of a logical-to-physical (L2P) table) prior to performing a read operation. In some cases, the memory system may perform a read operation that may be specified in a read command associated with the host performance booster mode. In some cases, the memory system may perform an HPB read operation based on receiving an HPB command that includes a physical address (rather than a logical block address). Activating or deactivating regions of the memory system for HPB mode may take computing resources. For example, the memory system may have to communicate the mapping to the host system as part of the initialization process. Performing HPB commands (after initialization), however, may be take less time and computing resources at the memory system.

In some cases, a system, such as system 100 as described with reference to FIG. 1, may determine whether to activate host booster performance operations (e.g., activating a host performance booster mode) based on the mode the system. For example, the system may be in a host control mode. In such cases, the host controller may determine whether to activate the host performance booster mode. In another example, the system may be in a device control mode. In such cases, the memory system may determine whether to activate the host performance booster mode based on a condition of the memory system.

Although operating in the host performance booster mode may provide for memory access at increased speeds, the host performance booster operations may result in significant use of computing resources to initialize the host performance booster mode. For example, when initializing the host performance booster mode, the memory system may send portions of the mapping (e.g., L2P table) to the host system. The host system may use those portions of the mapping to send a read command to the memory system that includes a physical address rather than a logical block address. By including the physical address, the memory system may refrain from performing an address translations step to translate the logical block address to the physical address.

Rather, the host system may perform that step before sending the read command, when operating in the host performance booster mode.

In some cases, it may be beneficial to refrain from activating the host performance booster mode because of the computational resources it may take to initially activate a region for HPB operations. For example, performing a read operation without using the host performance booster mode may mirror the performance of a read operation using the host performance booster mode if the portion of the mapping (e.g., L2P table) is already stored in the cache memory of the memory system (e.g., a cache hit situation for the logical block address in the read command). In such cases, refraining from activating the host performance booster mode may improve the performance of the memory system while decreasing the overall overhead of the memory system. In such cases, it may be desired to adjust a threshold for activating the host performance booster mode.

At 205, one or more read commands may be received from the host system. For example, the host system may transmit one or more read commands as part of a random read operation. In such cases, the memory system may receive the one or more read commands.

At 210, a random read pattern may be detected. For example, the memory system may detect that the one or more read commands may be associated with a random read pattern. A random read pattern may be an example of random (e.g., non-sequential or non-consecutive) addresses accessed as part of the read command (e.g., either logical block addresses or physical addresses). For example, the memory system may execute the one or more read commands and may detect a pattern of the addresses accessed as part of a random read operation. In such cases, the pattern may be associated with a random read operation.

At 215, a cache space may be increased. For example, the memory system may increase an amount of space in a cache for the mapping between the logical block addresses and the physical address (e.g., L2P table) based on detecting the random read pattern. The mapping may be an example of a mapping between logical block addresses and physical addresses in the memory system. If a random read pattern is detected, the memory system may allocate additional space in the cache to increase a cache hit rate for the addresses of incoming read operations. For example, the cache may have a capacity of 128 GB, and the memory system may use 16 GB of the total cache capacity for the mapping (e.g., L2P table). Based on detecting the random read pattern, the memory system may increase the active (e.g., in use) cache space from 16 GB to 32 GB, thereby storing an additional portion of the L2P mapping table in the extended cache portion. the memory system may store, in the cache, an additional portion of the mapping in the increased amount of space in direct response to increasing the amount of space.

At 220, a determination may be made whether a cache hit rate of addresses in incoming read operations with the portions of the mapping stored in the cache satisfies a threshold. For example, the memory system may determine, for a second set of one or more read commands, whether the cache hit rate for a portion of the mapping (e.g., L2P table) satisfies the threshold. The cache hit rate for the L2P table may be the frequency with which the memory system already has that portion of the L2P table stored in SRAM. A cache miss may occur when an address of an incoming read command is not in a portion of the L2P stored currently stored in the cache. In such cases, the memory system may load a new portion of the L2P table from the non-volatile memory device (e.g., NAND device) into the cache. In some cases, determining whether the cache hit rate for the L2P table satisfies the threshold may be based on adjusting a threshold. In some cases, the memory system may adjust the threshold used to determine whether to enter the host performance booster mode based on detecting the pattern. For example, the host system may access a memory range (e.g., 1 GB). In some cases, within this memory range, the performance of the read operation (e.g., non-host performance booster mode) may be the same or may be greater than the performance of the read operation using the host performance booster mode. In such cases, the memory system may increase the threshold used to determine whether to enter the host performance booster mode. In other examples, the host system may access a larger memory range (e.g., 16 GB, 128 GB, or the like). In such cases, within the larger memory range, the performance of the read operation (e.g., non-host performance booster mode) may be less than the performance of the read operation using the host performance booster mode. In such cases, the memory system may decrease the threshold used to determine whether to enter the host performance booster mode. In some cases, the memory system may adjust the threshold based on the size of the accessed memory, the cache hit rate for the L2P table, the parse rate of the memory system, or a combination thereof.

In some examples, determining whether the L2P cache hit rate satisfies the threshold may be based on storing the additional portion of the mapping in the increased amount of space. In such cases, the determined L2P cache hit rate may be based on the hit rate of the extended cache portion. For example, the memory system may perform a random read operation and access an increased portion of the memory array. In such cases, the memory system may store an additional portion of the L2P table in the extended cache portion. If the memory system rapidly accesses the increased portion of the memory array, the cache hit rate may increase. In such cases, the memory system may determine that the L2P cache hit rate satisfies (e.g., is above) the threshold. In such cases, the memory system may determine whether the L2P cache hit rate satisfies a threshold based on storing the additional L2P mapping data in the extended cache portion. Based on determining whether the L2P cache hit rate satisfies the threshold, the memory system may determine whether to activate or refrain from activating the host performance booster mode.

At 225, the host performance booster mode may be activated. For example, the memory system may activate the host performance booster mode based on determining that the L2P cache hit rate is below the threshold. In such cases, the memory system may determine that the cache hit rate fails to satisfy the threshold. In some cases, activating the host performance booster mode may increase a quantity of write operations performed on the memory system.

At 230, the host performance booster mode may be refrained from activating. For example, the memory system may refrain from activating the host performance booster mode based on determining that the L2P cache hit rate is above the threshold. In such cases, the memory system may determine that the cache hit rate satisfies the threshold. In some cases, refraining (e.g., avoiding) activating the host performance booster mode may decrease a quantity of write operations performed on the memory system.

At 235, an indication may be transmitted. For example, the memory system may transmit, to the host system, an indication of the operating mode in direct response to determining whether to activate the host performance booster mode. In some cases, the memory system may transmit an indication that the memory system refrained from activating the host performance booster mode. In other examples, the memory system may transmit, to the host system, an indication of the host performance booster mode activation. Upon receiving the indication of the host performance booster mode activation, the host system may store a portion of the L2P table in a cache of the host system for subsequent the host performance booster operations. In some cases, the memory system may transmit the portion of the L2P table to the host system as part of activating that region for HPB operations.

In some cases, the host system may perform one or more access operations according to the host performance booster operation. The host performance booster operation may be activated to load a portion of a L2P table per region (e.g., per block) to a host system. The L2P table may configured to store a mapping between LBAs and physical addresses. In such cases, the host system may store mappings between LBAs and physical addresses of the region to a local L2P table. Thus, the host performance booster mode may cause a second cache memory associated with the host system to store at least a portion of the mapping. For example, the host system may receive the L2P table for a region associated with the access operations in memory system. The local L2P table may be stored in a cache of the host system. In some cases, the cache may be or may include SRAM, DRAM, HRAM, or the like. If subsequent access operations are performed on the region, the host system may access the associated memory cells using the physical addresses stored in the L2P table (e.g., using the mapping between an LBA and associated physical address stored in the L2P table).

At 240, a read command may be received. For example, the host system may transmit a read command to the memory system. The memory system may receive the read command in response to activating the host performance booster mode or refraining from activating the host performance booster mode. In some examples, the read command may be an example of a host performance booster read command based on the memory controller activating the host performance booster mode and transmitting the indication. The host performance booster read command may include the L2P mapping data associated with the accessed portion of the memory array. In other examples, the read command may be based on the memory system refraining from activating the host performance booster mode and transmitting the indication.

At 245, a read operation may be performed. For example, the memory system may perform the read operation associated with the read command in response to receiving the read command and determining whether to activate the host performance booster mode. In some examples, the memory system may perform, using the host performance booster mode, the read operation based on activating the host performance booster mode. In other examples, the memory system may perform, without using the host performance booster mode, the read operation based on refraining from activating the host performance booster mode.

In some cases, adjusting the threshold for activating the HPB mode may allow the memory controller to avoid significant signaling overhead, thereby increasing efficiency of the memory system which may result in the memory system experiencing improved read, write, and erase speeds, reduced power consumption used by the computing resources, improved processing times, and the like.

Figure 3:
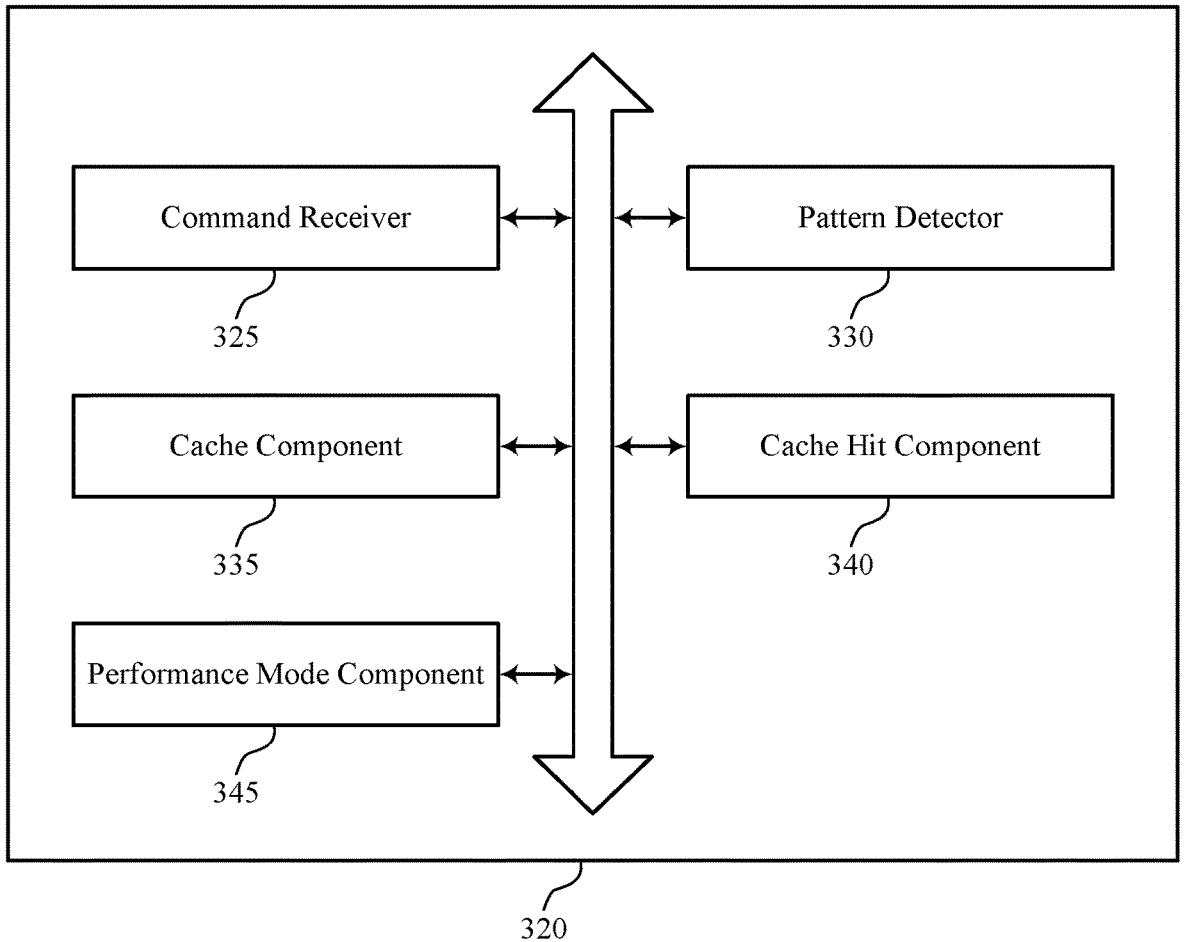
FIG. 3 shows a block diagram of a memory system that supports performance benchmark for host performance booster in accordance with examples as disclosed herein.

FIG. 3 shows a block diagram 300 of a memory system 320 that supports performance benchmark for host performance booster in accordance with examples as disclosed herein. The memory system 320 may be an example of aspects of a memory system as described with reference to FIGS. 1 through 2. The memory system 320, or various components thereof, may be an example of means for performing various aspects of performance benchmark for host performance booster as described herein. For example, the memory system 320 may include a command receiver 325, a pattern detector 330, a cache component 335, a cache hit component 340, a performance mode component 345, or any combination thereof. Each of these components may communicate, directly or indirectly, with one another (e.g., via one or more buses).

The command receiver 325 may be configured as or otherwise support a means for receiving, from a host system, a first plurality of read commands. The pattern detector 330 may be configured as or otherwise support a means for detecting a pattern of random physical addresses accessed as part of the first plurality of read commands. The cache component 335 may be configured as or otherwise support a means for increasing, in a cache memory of a memory system based at least in part on detecting the pattern, an amount of space for a mapping between logical block addresses and physical addresses. The cache hit component 340 may be configured as or otherwise support a means for determining, for a second plurality of read commands based at least in part on increasing the amount of space in the cache memory, whether a rate of cache hits for a portion of the mapping stored in the amount of space of the cache memory satisfies a threshold. The performance mode component 345 may be configured as or otherwise support a means for determining whether to activate a host performance booster mode based at least in part on determining whether the rate of cache hits satisfies the threshold.

In some examples, the performance mode component 345 may be configured as or otherwise support a means for refraining from activating the host performance booster mode based at least in part on determining that the rate of cache hits for the mapping is above the threshold.

In some examples, the command receiver 325 may be configured as or otherwise support a means for receiving, from the host system, a read command based at least in part on refraining from activating the host performance booster mode. In some examples, the performance mode component 345 may be configured as or otherwise support a means for performing a read operation associated with the read command based at least in part on receiving the read command and determining whether to activate the host performance booster mode.

In some examples, the performance mode component 345 may be configured as or otherwise support a means for activating the host performance booster mode based at least in part on determining that the rate of cache hits for the mapping is below the threshold, where activating the host performance booster mode is based at least in part on the determining.

In some examples, the command receiver 325 may be configured as or otherwise support a means for receiving, from the host system, a read command based at least in part on activating the host performance booster mode. In some examples, the performance mode component 345 may be configured as or otherwise support a means for performing, using the host performance booster mode, a read operation associated with the read command based at least in part on receiving the read command and determining whether to activate the host performance booster mode.

In some examples, the cache component 335 may be configured as or otherwise support a means for storing, in the cache memory of the memory system, an additional portion of the mapping in the increased amount of space based at least in part on increasing the amount of space, where determining whether the rate of cache hits satisfies the threshold is based at least in part on storing the additional portion in the increased amount of space.

In some examples, the cache hit component 340 may be configured as or otherwise support a means for adjusting the threshold used to determine whether to enter the host performance booster mode based at least in part on detecting the pattern, where determining whether the rate of cache hits for the mapping satisfies the threshold is based at least in part on adjusting the threshold.

In some examples, the performance mode component 345 may be configured as or otherwise support a means for transmitting, to the host system, an indication of an operating mode based at least in part on determining whether to activate the host performance booster mode.

In some examples, the host performance booster mode causes a second cache memory associated with the host system to store at least a portion of the mapping.

Figure 4:
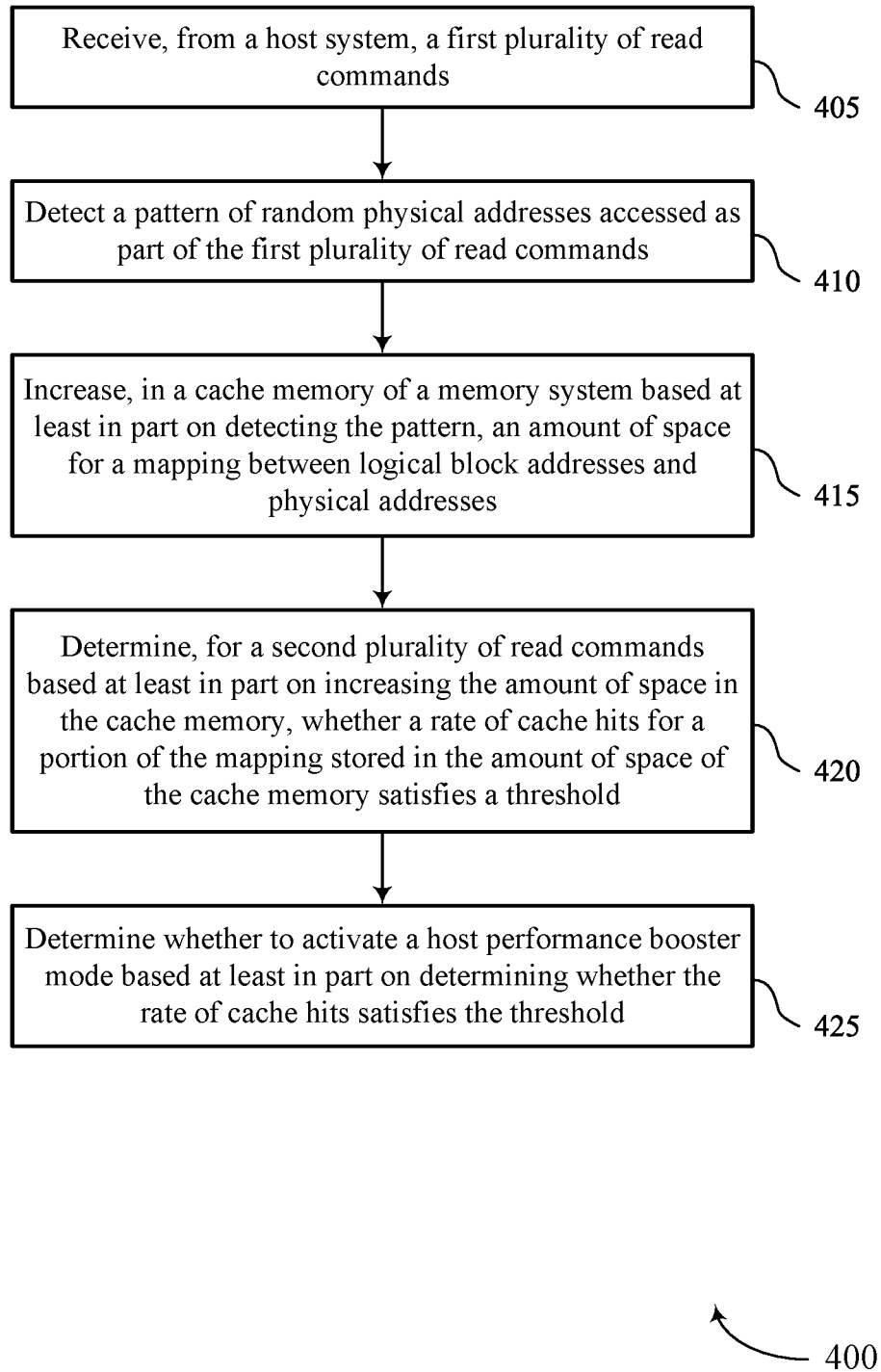
FIG. 4 shows a flowchart illustrating a method or methods that support performance benchmark for host performance booster in accordance with examples as disclosed herein.

FIG. 4 shows a flowchart illustrating a method 400 that supports performance benchmark for host performance booster in accordance with examples as disclosed herein. The operations of method 400 may be implemented by a memory system or its components as described herein. For example, the operations of method 400 may be performed by a memory system as described with reference to FIGS. 1 through 3. In some examples, a memory system may execute a set of instructions to control the functional elements of the device to perform the described functions. Additionally or alternatively, the memory system may perform aspects of the described functions using special-purpose hardware.

At 405, a first plurality of read commands may be received. For example, the method may include receiving, from a host system, a first plurality of read commands. The operations of 405 may be performed in accordance with examples as disclosed herein. In some examples, aspects of the operations of 405 may be performed by a command receiver 325 as described with reference to FIG. 3.

At 410, a pattern may detected. For example, the method may include detecting a pattern of random physical addresses accessed as part of the first plurality of read commands. The operations of 410 may be performed in accordance with examples as disclosed herein. In some examples, aspects of the operations of 410 may be performed by a pattern detector 330 as described with reference to FIG. 3.

At 415, an amount of space in a cache memory may be increased. For example, the method may include increasing, in a cache memory of a memory system based at least in part on detecting the pattern, an amount of space for a mapping between logical block addresses and physical addresses. The operations of 415 may be performed in accordance with examples as disclosed herein. In some examples, aspects of the operations of 415 may be performed by a cache component 335 as described with reference to FIG. 3.

At 420, a rate of cache hits may be determined. For example, the method may include determining, for a second plurality of read commands based at least in part on increasing the amount of space in the cache memory, whether a rate of cache hits for a portion of the mapping stored in the amount of space of the cache memory satisfies a threshold. The operations of 420 may be performed in accordance with examples as disclosed herein. In some examples, aspects of the operations of 420 may be performed by a cache hit component 340 as described with reference to FIG. 3.

At 425, a host performance booster mode may be activated. For example, the method may include determining whether to activate a host performance booster mode based at least in part on determining whether the rate of cache hits satisfies the threshold. The operations of 425 may be performed in accordance with examples as disclosed herein. In some examples, aspects of the operations of 425 may be performed by a performance mode component 345 as described with reference to FIG. 3.

In some examples, an apparatus as described herein may perform a method or methods, such as the method 400. The apparatus may include, features, circuitry, logic, means, or instructions (e.g., a non-transitory computer-readable medium storing instructions executable by a processor) for receiving, from a host system, a first plurality of read commands, detecting a pattern of random physical addresses accessed as part of the first plurality of read commands, increasing, in a cache memory of a memory system based at least in part on detecting the pattern, an amount of space for a mapping between logical block addresses and physical addresses, determining, for a second plurality of read commands based at least in part on increasing the amount of space in the cache memory, whether a rate of cache hits for a portion of the mapping stored in the amount of space of the cache memory satisfies a threshold, and determining whether to activate a host performance booster mode based at least in part on determining whether the rate of cache hits satisfies the threshold.

Some examples of the method 400 and the apparatus described herein may further include operations, features, circuitry, logic, means, or instructions for refraining from activating the host performance booster mode based at least in part on determining that the rate of cache hits for the mapping may be above the threshold.

Some examples of the method 400 and the apparatus described herein may further include operations, features, circuitry, logic, means, or instructions for receiving, from the host system, a read command based at least in part on refraining from activating the host performance booster mode and performing a read operation associated with the read command based at least in part on receiving the read command and determining whether to activate the host performance booster mode.

Some examples of the method 400 and the apparatus described herein may further include operations, features, circuitry, logic, means, or instructions for activating the host performance booster mode based at least in part on determining that the rate of cache hits for the mapping may be below the threshold, where activating the host performance booster mode may be based at least in part on the determining.

Some examples of the method 400 and the apparatus described herein may further include operations, features, circuitry, logic, means, or instructions for receiving, from the host system, a read command based at least in part on activating the host performance booster mode and performing, using the host performance booster mode, a read operation associated with the read command based at least in part on receiving the read command and determining whether to activate the host performance booster mode.

Some examples of the method 400 and the apparatus described herein may further include operations, features, circuitry, logic, means, or instructions for storing, in the cache memory of the memory system, an additional portion of the mapping in the increased amount of space based at least in part on increasing the amount of space, where determining whether the rate of cache hits satisfies the threshold may be based at least in part on storing the additional portion in the increased amount of space.

Some examples of the method 400 and the apparatus described herein may further include operations, features, circuitry, logic, means, or instructions for adjusting the threshold used to determine whether to enter the host performance booster mode based at least in part on detecting the pattern, where determining whether the rate of cache hits for the mapping satisfies the threshold may be based at least in part on adjusting the threshold.

Some examples of the method 400 and the apparatus described herein may further include operations, features, circuitry, logic, means, or instructions for transmitting, to the host system, an indication of an operating mode based at least in part on determining whether to activate the host performance booster mode.

In some examples of the method 400 and the apparatus described herein, the host performance booster mode causes a second cache memory associated with the host system to store at least a portion of the mapping.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if" "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory arrays comprising non-volatile memory cells;
   a cache memory comprising volatile memory cells; and
   processing circuitry coupled with the one or more memory arrays and configured to cause the memory system to:
   receive, from a host system, a first plurality of read commands;
   detect a pattern of random physical addresses accessed as part of the first plurality of read commands;
   increase, in the cache memory based at least in part on detecting the pattern, an amount of space for mapping logical block addresses to physical addresses, wherein increasing the amount of space in the cache memory comprises increasing an active cache space of the cache memory to include an extended cache portion;

receive, from the host system, a second plurality of read commands indicating to read data from a first region of the non-volatile memory cells;

store, in the extended cache portion of the cache memory based at least in part on reading the data from the first region of the non-volatile memory cells, a first portion of a mapping between a set of logical block addresses and a set of physical addresses associated with the first region of the non-volatile memory cells;

determine, for the second plurality of read commands based at least in part on storing the first portion of the mapping in the extended cache portion of the cache memory, that a first rate of cache hits of the extended cache portion fails to satisfy a threshold associated with activation of a host performance booster mode;

refrain from activating the host performance booster mode for the first region of the non-volatile memory cells based at least in part on the first rate of cache hits of the extended cache portion failing to satisfy the threshold associated with activation of the host performance booster mode;

receive, from the host system, a third plurality of read commands indicating to read second data from the first region of the non-volatile memory cells;

adjust the threshold associated with activation of the host performance booster mode based at least in part on the first rate of cache hits and a parse rate of the memory system;

determine, for the third plurality of read commands, that a second rate of cache hits of the extended cache portion satisfies the adjusted threshold associated with activation of the host performance booster mode;

activate the host performance booster mode for the first region of the non-volatile memory cells based at least in part on increasing the amount of space in the cache memory and determining that the second rate of cache hits of the extended cache portion satisfies the adjusted threshold, wherein the host performance booster mode is deactivated for a second region of the non-volatile memory cells; and transmit, to the host system, a second portion of the mapping between the set of logical block addresses and the set of physical addresses associated with the first region of the non-volatile memory cells based at least in part on activating the host performance booster mode and the second rate of cache hits for the first portion of the mapping satisfying the threshold.

2. The memory system of claim 1, wherein the processing circuitry is further configured to cause the memory system to:

determine that the second rate of cache hits for the first portion of the mapping is below the threshold, wherein activating the host performance booster mode is based at least in part on the determining that the second rate of cache hits for the first portion of the mapping is below the threshold.

3. The memory system of claim 2, wherein the processing circuitry is further configured to cause the memory system to:

receive, from the host system, a read command based at least in part on activating the host performance booster mode; and perform, using the host performance booster mode, a read operation associated with the read command based at least in part on receiving the read command and activating the host performance booster mode.

4. The memory system of claim 1, wherein the processing circuitry is further configured to cause the memory system to:

transmit, to the host system, an indication of an operating mode based at least in part on activating the host performance booster mode.

5. The memory system of claim 1, wherein the host performance booster mode causes a second cache memory associated with the host system to store at least a portion of the mapping.

6. The memory system of claim 1, wherein the first rate of cache hits is a frequency with which the memory system comprises a corresponding address in the cache memory for one or more incoming read commands.

7. A non-transitory computer-readable medium storing code comprising instructions, which when executed by one or more processors of an electronic device, cause the electronic device to:

receive, from a host system, a first plurality of read commands;

detect a pattern of random physical addresses accessed as part of the first plurality of read commands;

increase, in a cache memory of a memory system based at least in part on detecting the pattern, an amount of space for mapping logical block addresses to physical addresses, wherein increasing the amount of space in the cache memory comprises increasing an active cache space of the cache memory to include an extended cache portion;

receive, from the host system, a second plurality of read commands indicating to read data from a first region of non-volatile memory cells of the memory system;

store, in the extended cache portion of the cache memory based at least in part on reading the data from the first region of the non-volatile memory cells, a first portion of a mapping between a set of logical block addresses and a set of physical addresses associated with the first region of the non-volatile memory cells;

determine, for the second plurality of read commands based at least in part on storing the first portion of the mapping in the extended cache portion of the cache memory, that a first rate of cache hits of the extended cache portion fails to satisfy a threshold associated with activation of a host performance booster mode;

refrain from activating the host performance booster mode for the first region of the non-volatile memory cells based at least in part on the first rate of cache hits of the extended cache portion failing to satisfy the threshold associated with activation of the host performance booster mode;

receive, from the host system, a third plurality of read commands indicating to read second data from the first region of the non-volatile memory cells;

adjust the threshold associated with activation of the host performance booster mode based at least in part on the first rate of cache hits and a parse rate of the memory system;

determine, for the third plurality of read commands, that a second rate of cache hits of the extended cache portion satisfies the adjusted threshold associated with activation of the host performance booster mode;
activate the host performance booster mode for the first region of the non-volatile memory cells based at least in part on increasing the amount of space in the cache memory and determining that the second rate of cache hits of the extended cache portion satisfies the adjusted threshold, wherein the host performance booster mode is deactivated for a second region of the non-volatile memory cells; and
transmit, to the host system, a second portion of the mapping between the set of logical block addresses and the set of physical addresses associated with the first region of the non-volatile memory cells based at least in part on activating the host performance booster mode and the second rate of cache hits for the first portion of the mapping satisfying the threshold.

8. The non-transitory computer-readable medium of claim 7, wherein the instructions, when executed by the one or more processors of the electronic device, further cause the electronic device to:
determine that the second rate of cache hits for the first portion of the mapping is below the threshold, wherein activating the host performance booster mode is based at least in part on the determining that the second rate of cache hits for the first portion of the mapping is below the threshold.

9. The non-transitory computer-readable medium of claim 8, wherein the instructions, when executed by the one or more processors of the electronic device, further cause the electronic device to:
receive, from the host system, a read command based at least in part on activating the host performance booster mode; and
perform, using the host performance booster mode, a read operation associated with the read command based at least in part on receiving the read command and activating the host performance booster mode.

10. The non-transitory computer-readable medium of claim 7, wherein the instructions, when executed by the one or more processors of the electronic device, further cause the electronic device to:
transmit, to the host system, an indication of an operating mode based at least in part on activating the host performance booster mode.

11. The non-transitory computer-readable medium of claim 7, wherein the first rate of cache hits is a frequency with which the memory system comprises a corresponding address in the cache memory for one or more incoming read commands.

12. A method, comprising:
receiving, from a host system, a first plurality of read commands;
detecting a pattern of random physical addresses accessed as part of the first plurality of read commands;
increasing, in a cache memory of a memory system based at least in part on detecting the pattern, an amount of space for mapping logical block addresses to physical addresses, wherein increasing the amount of space in the cache memory comprises increasing an active cache space of the cache memory to include an extended cache portion;
receiving, from the host system, a second plurality of read commands indicating to read data from a first region of non-volatile memory cells of the memory system;
storing, in the extended cache portion of the cache memory based at least in part on reading the data from the first region of the non-volatile memory cells, a first portion of a mapping between a set of logical block addresses and a set of physical addresses associated with the first region of the non-volatile memory cells;
determining, for the second plurality of read commands based at least in part on storing the first portion of the mapping in the extended cache portion of the cache memory, that a first rate of cache hits of the extended cache portion fails to satisfy a threshold associated with activation of a host performance booster mode;
refrain from activating the host performance booster mode for the first region of the non-volatile memory cells based at least in part on the first rate of cache hits of the extended cache portion failing to satisfy the threshold associated with activation of the host performance booster mode;
receive, from the host system, a third plurality of read commands indicating to read second data from the first region of the non-volatile memory cells;
adjust the threshold associated with activation of the host performance booster mode based at least in part on the first rate of cache hits and a parse rate of the memory system;
determine, for the third plurality of read commands, that a second rate of cache hits of the extended cache portion satisfies the adjusted threshold associated with activation of the host performance booster mode;
activating the host performance booster mode for the first region of the non-volatile memory cells based at least in part on increasing the amount of space in the cache memory and determining that the second rate of cache hits of the extended cache portion satisfies the adjusted threshold, wherein the host performance booster mode is deactivated for a second region of the non-volatile memory cells; and
transmitting, to the host system, a second portion of the mapping between the set of logical block addresses and the set of physical addresses associated with the first region of the non-volatile memory cells based at least in part on activating the host performance booster mode and the second rate of cache hits for the first portion of the mapping satisfying the threshold.

13. The method of claim 12, further comprising:
determining that the second rate of cache hits for the first portion of the mapping is below the threshold, wherein activating the host performance booster mode is based at least in part on the determining that the second rate of cache hits for the first portion of the mapping is below the threshold.

14. The method of claim 13, further comprising:
receiving, from the host system, a read command based at least in part on activating the host performance booster mode; and
performing, using the host performance booster mode, a read operation associated with the read command based at least in part on receiving the read command and activating the host performance booster mode.

15. The method of claim 12, further comprising:
adjusting the threshold used to determine whether to enter the host performance booster mode based at least in part on detecting the pattern, wherein determining that the second rate of cache hits for the first portion of the mapping satisfies the threshold is based at least in part on adjusting the threshold.

16. The method of claim 12, further comprising:
transmitting, to the host system, an indication of an operating mode based at least in part on activating the host performance booster mode.

17. The method of claim 12, wherein the first rate of cache hits is a frequency with which the memory system comprises a corresponding address in the cache memory for one or more incoming read commands.

* * * * *